United States Patent
Stell et al.

(10) Patent No.: US 7,244,871 B2
(45) Date of Patent: *Jul. 17, 2007

(54) PROCESS AND APPARATUS FOR REMOVING COKE FORMED DURING STEAM CRACKING OF HYDROCARBON FEEDSTOCKS CONTAINING RESIDS

(75) Inventors: Richard C. Stell, Houston, TX (US); Arthur R. Di Nicolantonio, Seabrook, TX (US); James M. Frye, Houston, TX (US); Subramanian Annamalai, Singapore (SG); Nicholas G. Vidonic, Seabrook, TX (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 404 days.

This patent is subject to a terminal disclaimer.

(21) Appl. No.: 10/851,487

(22) Filed: May 21, 2004

(65) Prior Publication Data

US 2005/0261532 A1    Nov. 24, 2005

(51) Int. Cl.
*C07C 4/04*       (2006.01)
(52) U.S. Cl. ...................... 585/648; 585/652
(58) Field of Classification Search ........... 585/648, 585/652

See application file for complete search history.

(56) References Cited

U.S. PATENT DOCUMENTS

| | | | |
|---|---|---|---|
| 1,936,699 A | 11/1933 | Weaver | |
| 1,984,569 A | 12/1934 | Cooke et al. | 196/66 |
| 2,091,261 A | 8/1937 | Alther | 196/49 |
| 2,158,425 A | 5/1939 | Ragatz | 196/73 |
| 3,291,573 A | 12/1966 | Frescoln | 23/284 |
| 3,341,429 A | 9/1967 | Fondrk | 203/95 |
| 3,413,211 A | 11/1968 | Becraft et al. | 208/93 |
| 3,487,006 A | 12/1969 | Newman et al. | 208/93 |
| 3,492,795 A | 2/1970 | Guerrieri | 55/463 |
| 3,505,210 A | 4/1970 | Wallace et al. | 208/228 |
| 3,617,493 A | 11/1971 | Wirth et al. | 208/80 |
| 3,677,234 A | 7/1972 | Dutkiewicz | 122/240 |

(Continued)

FOREIGN PATENT DOCUMENTS

DE        1093351        11/1960

(Continued)

OTHER PUBLICATIONS

Dennis A. Duncan and Vance A. Ham, Stone & Webster, "The Practicalities of Stream-Cracking Heavy Oil", Mar. 29-Apr. 2, 1992, AIChE Spring National Meeting in New Orleans, LA, pp. 1-41.

ABB Lummus Crest Inc., (presentation) HOPS, "Heavy Oil Processing System", Jun. 15, 1992 TCC PEW Meeting, pp. 1-18.

Mitsui Sekka Engineering Co., Ltd./Mitsui Engineering & Shipbuilding Co., Ltd, "Mitsui Advanced Cracker & Mitsui Innovative Quencher", pp. 1-16, date not available.

"Specialty Furnace Design: Steam Reformers and Steam Crackers", presented by T.A. Wells of the M.W. Kellogg Company, 1988 AIChE Spring National Meeting.

*Primary Examiner*—Thuan Dinh Dang

(57) ABSTRACT

A process for decoking of a process that cracks hydrocarbon feedstock containing resid and coke precursors, wherein steam is added to the feedstock to form a mixture which is thereafter separated into a vapor phase and a liquid phase by flashing in a flash/separation vessel, separating and cracking the vapor phase, and recovering cracked product. Coking of internal surfaces in and proximally downstream of the vessel is controlled by interrupting the feed flow, purging the vessel with steam, introducing an air/steam mixture to at least partially combust the coke, and resuming the feed flow when sufficient coke has been removed. An apparatus for carrying out the process is also provided.

52 Claims, 1 Drawing Sheet

U.S. PATENT DOCUMENTS

| | | | |
|---|---|---|---|
| 3,718,709 A | 2/1973 | Simonetta | 260/683 R |
| 3,900,300 A | 8/1975 | Lehman | |
| 4,199,409 A | 4/1980 | Skraba | 203/39 |
| 4,264,432 A | 4/1981 | Gartside | 208/48 R |
| 4,300,998 A | 11/1981 | Gartside | 208/127 |
| 4,311,580 A | 1/1982 | Bartholic | 208/91 |
| 4,361,478 A | 11/1982 | Gengler et al. | |
| 4,400,182 A | 8/1983 | Davies et al. | |
| 4,426,278 A | 1/1984 | Kosters | 208/130 |
| 4,543,177 A | 9/1985 | Murthy et al. | 208/130 |
| 4,615,795 A | 10/1986 | Woebcke et al. | 208/72 |
| 4,714,109 A | 12/1987 | Tsao | 165/104.18 |
| 4,732,740 A | 3/1988 | Woebcke et al. | 422/193 |
| 4,840,725 A | 6/1989 | Paspek | 208/130 |
| 4,854,944 A | 8/1989 | Strong | 48/214 R |
| 4,954,247 A | 9/1990 | Lipkin et al. | |
| 5,096,567 A | 3/1992 | Paspek, Jr. et al. | 208/106 |
| 5,120,892 A | 6/1992 | Skraba | 585/652 |
| 5,190,634 A | 3/1993 | Fernandez-Baujin et al. | 208/107 |
| 5,468,367 A | 11/1995 | Dickakian | 208/48 |
| 5,580,443 A | 12/1996 | Yoshida et al. | 208/130 |
| 5,817,226 A | 10/1998 | Lenglet | |
| 5,910,440 A | 6/1999 | Grossman et al. | |
| 6,093,310 A | 7/2000 | Swan | |
| 6,123,830 A | 9/2000 | Gupta et al. | |
| 6,179,997 B1 | 1/2001 | Vedder, Jr. et al. | 208/113 |
| 6,190,533 B1 | 2/2001 | Bradow et al. | |
| 6,210,561 B1 | 4/2001 | Bradow et al. | |
| 6,303,842 B1 | 10/2001 | Bridges et al. | |
| 6,376,732 B1 | 4/2002 | Ngan et al. | |
| 6,632,351 B1 | 10/2003 | Ngan et al. | 208/132 |
| 6,743,961 B2 | 6/2004 | Powers | |
| 2001/0016673 A1 | 8/2001 | Bridges et al. | |
| 2003/0070963 A1 | 4/2003 | Zimmerman et al. | 208/106 |
| 2004/0004022 A1 | 1/2004 | Stell et al. | 208/106 |
| 2004/0004027 A1 | 1/2004 | Spicer et al. | 208/130 |
| 2004/0004028 A1 | 1/2004 | Stell et al. | 208/130 |
| 2004/0039240 A1 | 2/2004 | Powers | 585/652 |
| 2004/0054247 A1 | 3/2004 | Powers | |
| 2005/0010075 A1 | 1/2005 | Powers | |

FOREIGN PATENT DOCUMENTS

| | | |
|---|---|---|
| EP | 0063448 | 10/1982 |
| FR | 1472280 | 3/1967 |
| GB | 199 766 | 6/1923 |
| GB | 998 504 | 7/1965 |
| GB | 1 053 751 | 1/1967 |
| GB | 1 203 017 | 8/1970 |
| GB | 1 233 795 | 5/1971 |
| GB | 2006259 | 10/1977 |
| GB | 2012176 | 11/1977 |
| NL | 7410163 | 4/1975 |
| SU | 1491552 | 7/1989 |
| WO | WO 01/55280 | 8/2001 |
| ZA | 907394 | 7/1991 |

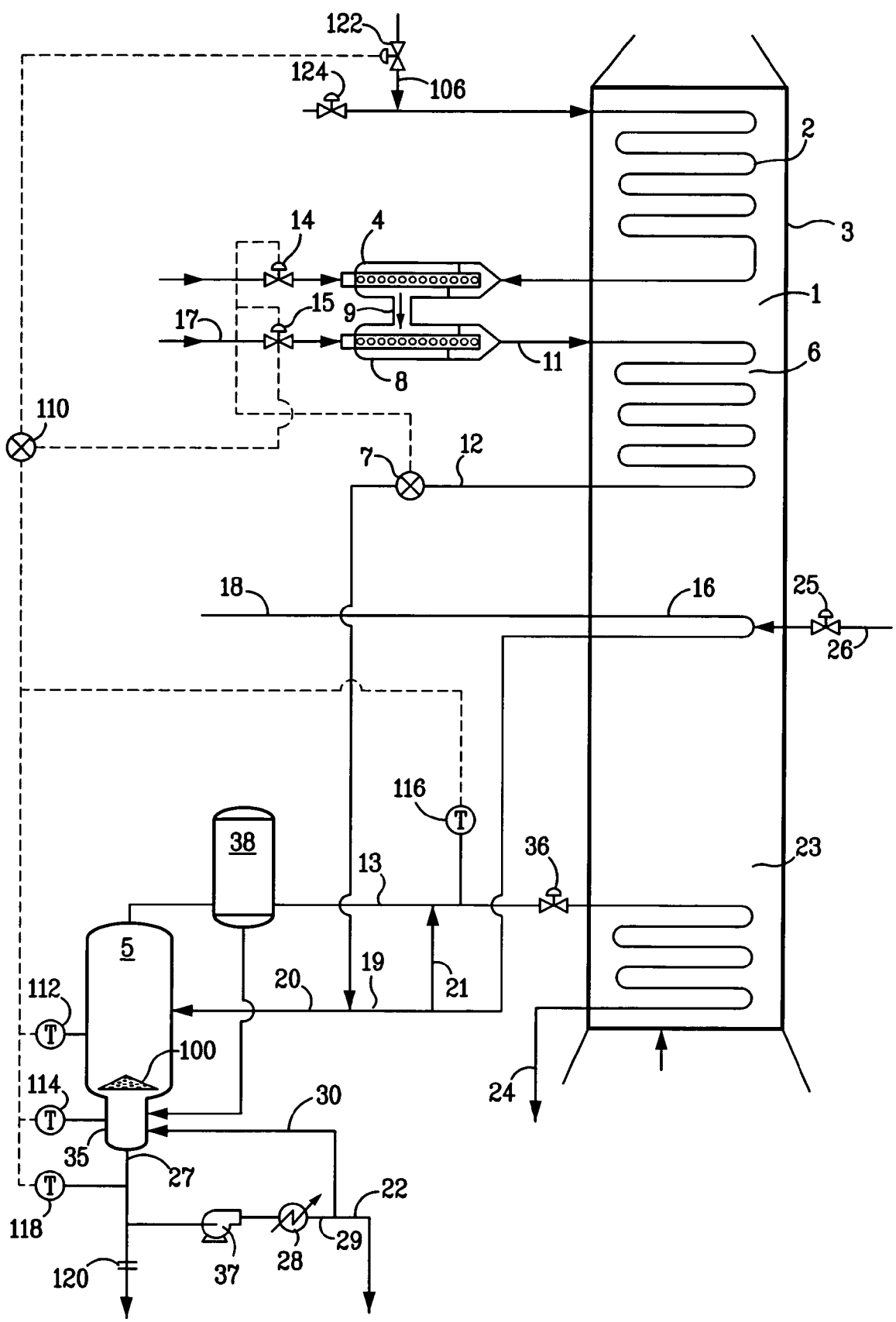

PROCESS AND APPARATUS FOR REMOVING COKE FORMED DURING STEAM CRACKING OF HYDROCARBON FEEDSTOCKS CONTAINING RESIDS

FIELD OF THE INVENTION

The present invention relates to the cracking of hydrocarbons that contain relatively non-volatile hydrocarbons and other contaminants. More particularly, the present invention relates to reducing coking in apparatus used for cracking hydrocarbons.

BACKGROUND

Steam cracking, also referred to as pyrolysis, has long been used to crack various hydrocarbon feedstocks into olefins, preferably light olefins such as ethylene, propylene, and butenes. Conventional steam cracking utilizes a pyrolysis furnace which has two main sections: a convection section and a radiant section. The hydrocarbon feedstock typically enters the convection section of the furnace as a liquid (except for light feedstocks which enter as a vapor) wherein it is typically heated and vaporized by indirect contact with hot flue gas from the radiant section and by direct contact with steam. The vaporized feedstock and steam mixture is then introduced into the radiant section where the cracking takes place. The resulting products including olefins leave the pyrolysis furnace for further downstream processing, including quenching.

Pyrolysis involves heating the feedstock sufficiently to cause thermal decomposition of the larger molecules. The pyrolysis process, however, produces molecules which tend to combine to form high molecular weight materials known as tar. Tar is a high-boiling point, viscous, reactive material that can foul equipment under certain conditions. In general, feedstocks containing higher boiling materials tend to produce greater quantities of tar.

The formation of tar after the pyrolysis effluent leaves the steam cracking furnace can be minimized by rapidly reducing the temperature of the effluent exiting the pyrolysis unit to a level at which the tar-forming reactions are greatly slowed. This cooling which may be achieved in one or more steps and using one or more methods is referred to as quenching.

Conventional steam cracking systems have been effective for cracking high-quality feedstock which contain a large fraction of light volatile hydrocarbons, such as gas oil and naphtha. However, steam cracking economics sometimes favor cracking lower cost heavy feedstocks such as, by way of non-limiting examples, crude oil and atmospheric residue. Crude oil and atmospheric residue often contain high molecular weight, non-volatile components with boiling points in excess of 1100° F. (590° C.) otherwise known as resids. The non-volatile components of these feedstocks lay down as coke in the convection section of conventional pyrolysis furnaces. Only very low levels of non-volatile components can be tolerated in the convection section downstream of the point where the lighter components have fully vaporized.

In most commercial naphtha and gas oil crackers, cooling of the effluent from the cracking furnace is normally achieved using a system of transfer line heat exchangers, a primary fractionator, and a water quench tower or indirect condenser. The steam generated in transfer line exchangers can be used to drive large steam turbines which power the major compressors used elsewhere in the ethylene production unit. To obtain high energy-efficiency and power production in the steam turbines, it is necessary to superheat the steam produced in the transfer line exchangers.

Cracking heavier feeds, such as kerosenes and gas oils, produces large amounts of tar, which lead to rapid coking in the radiant section of the furnace as well as fouling in the transfer line exchangers preferred in lighter liquid cracking service.

Additionally, during transport some naphthas are contaminated with heavy crude oil containing non-volatile components. Conventional pyrolysis furnaces do not have the flexibility to process residues, crudes, or many residue or crude contaminated gas oils or naphthas which are contaminated with non-volatile components.

To address coking problems, U.S. Pat. No. 3,617,493, which is incorporated herein by reference, discloses the use of an external vaporization drum for the crude oil feed and discloses the use of a first flash to remove naphtha as vapor and a second flash to remove vapors with a boiling point between 450 and 1100° F. (230 and 590° C.). The vapors are cracked in the pyrolysis furnace into olefins and the separated liquids from the two flash tanks are removed, stripped with steam, and used as fuel.

U.S. Pat. No. 3,718,709, which is incorporated herein by reference, discloses a process to minimize coke deposition. It describes preheating of heavy feedstock inside or outside a pyrolysis furnace to vaporize about 50% of the heavy feedstock with superheated steam and the removal of the residual, separated liquid. The vaporized hydrocarbons, which contain mostly light volatile hydrocarbons, are subjected to cracking. Periodic regeneration above pyrolysis temperature is effected with air and steam.

U.S. Pat. No. 5,190,634, which is incorporated herein by reference, discloses a process for inhibiting coke formation in a furnace by preheating the feedstock in the presence of a small, critical amount of hydrogen in the convection section. The presence of hydrogen in the convection section inhibits the polymerization reaction of the hydrocarbons thereby inhibiting coke formation.

U.S. Pat. No. 5,580,443, which is incorporated herein by reference, discloses a process wherein the feedstock is first preheated and then withdrawn from a preheater in the convection section of the pyrolysis furnace. This preheated feedstock is then mixed with a predetermined amount of steam (the dilution steam) and is then introduced into a gas-liquid separator to separate and remove a required proportion of the non-volatiles as liquid from the separator. The separated vapor from the gas-liquid separator is returned to the pyrolysis furnace for heating and cracking.

Co-pending U.S. application Ser. No. 10/188461 filed Jul. 3, 2002, patent application Publication US 2004/0004022 A1, published Jan. 8, 2004, which is incorporated herein by reference, describes an advantageously controlled process to optimize the cracking of volatile hydrocarbons contained in the heavy hydrocarbon feedstocks and to reduce and avoid coking problems. It provides a method to maintain a relatively constant ratio of vapor to liquid leaving the flash by maintaining a relatively constant temperature of the stream entering the flash. More specifically, the constant temperature of the flash stream is maintained by automatically adjusting the amount of a fluid stream mixed with the heavy hydrocarbon feedstock prior to the flash. The fluid can be water.

U.S. Patent Application Ser. No. 60/555,282, filed Mar. 22, 2004, which is incorporated herein by reference, describes a process for cracking heavy hydrocarbon feedstock which mixes heavy hydrocarbon feedstock with a fluid, e.g., hydrocarbon or water, to form a mixture stream which is flashed to form a vapor phase and a liquid phase, the vapor phase being subsequently cracked to provide olefins, and the product effluent cooled in a transfer line exchanger, wherein the amount of fluid mixed with the feedstock is varied in accordance with a selected operating parameter of the process, e.g., temperature of the mixture stream before the mixture stream is flashed.

In using a flash to separate heavy liquid hydrocarbon fractions from the lighter fractions which can be processed in the pyrolysis furnace, it is important to effect the separation so that most of the non-volatile components will be in the liquid phase. Otherwise, heavy, coke-forming non-volatile components in the vapor are carried into the furnace causing coking problems. However, the flashing in a flash/separation vessel is typically accompanied by coking of internal surfaces in and proximally downstream of the vessel. The extent of such coking is dependent upon various factors including feed type, preheating protocol, and design of the vessel. Liquids contacting the internal surfaces of the vessel and downstream equipment provide coatings of films that are precursors to coke. Excessive temperatures, such as above about 427° C. (800° F.), typically from about 450 to about 460° C. (840 to about 860° F.) or from about 510° to above about 621° C. (950° F. to 1150° F.), depending on the feedstock, are theorized to lead to excessive coke formation by thermal cracking and heat soaking of the heavy end of the heavy hydrocarbon feedstock stream. Because this coke buildup can effect restriction and increase pressure drop within the overall process, it would be advantageous to control the buildup within the flash zone and immediately downstream of the flash zone.

SUMMARY

In one aspect, the present invention relates to a process for removing coke formed during cracking of hydrocarbon feedstock containing resid and coke precursors, wherein steam is added to the feedstock to form a mixture which is thereafter separated into a vapor phase and a liquid phase by flashing in a flash/separation vessel. The vapor phase is then separated and cracked and the resulting cracked product recovered. Coking of internal surfaces in and proximally downstream of the vessel is controlled by interrupting the feed flow, purging the vessel with steam, introducing an air/steam mixture to at least partially combust the coke, and resuming the feed flow when sufficient coke has been removed.

In another aspect, the present invention relates to a process for removing coke formed during cracking of a hydrocarbon feedstock containing resid and coke precursors. The process comprises: (a) heating the hydrocarbon feedstock; (b) mixing the heated hydrocarbon feedstock with a primary dilution steam stream to form a mixture stream containing coke precursors; (c) flashing the mixture stream in a flash/separation vessel to form a coke precursor depleted vapor phase and a coke precursor rich liquid phase; (d) removing the liquid phase through a bottom outlet and vapor phase with a trace of condensed vapor phase through an overhead outlet in the flash/separation vessel, which vessel comprises internal surfaces and associated outlet piping, which surfaces and piping become coated during operation with said liquid phase and/or condensed vapor phase and thereafter at least partially coked; (e) cracking the vapor phase in a radiant section of a pyrolysis furnace to produce an effluent comprising olefins, the pyrolysis furnace comprising a radiant section and a convection section; (f) quenching the effluent and recovering cracked product therefrom; and (g) determining the level of coking in the flash/separation vessel or in piping immediately downstream of said flash/separation vessel, and when a predetermined upper coke level is reached; (i) interrupting flow of the hydrocarbon feedstock containing resid and coke precursors to the flash/separation vessel; (ii) purging the flash/separation vessel with steam under conditions sufficient to substantially remove the vapor phase from the vessel and the liquid phase from the internal surfaces and/or outlet piping; (iii) introducing an air/steam mixture through the flash/separation vessel under conditions sufficient to at least partially combust coke on the internal surfaces and outlet piping; and (iv) restarting the flow of the hydrocarbon feedstock to the flash/separation vessel when a predetermined lower coke level on the internal surfaces and/or outlet piping is reached.

In an embodiment of this aspect of the present invention, the flash/separation vessel comprises a baffle positioned above the liquid outlet which carries liquid outward and from the center of the vessel and downward. Typically, the baffle can be of any suitable shape, e.g., a substantially conical baffle whose apex points up, effecting the desired flow of liquid outward and downward. The baffle can be perforated, typically comprising perforations substituting for at least about 1% of the total surface area of a corresponding unperforated baffle. In another embodiment of this aspect of the present invention, the flash/separation vessel is substantially cylindrical. The mixture stream is introduced to the flash/separation vessel in a suitable manner, typically, by introducing the mixture stream i) tangentially through at least one side inlet located in the side of the vessel, ii) radially through at least one side inlet located in the side of the vessel, iii) through the top of the vessel, and/or iv) through the bottom of the vessel, and the vapor phase is removed through an overhead outlet of the vessel. In one embodiment, the mixture stream is introduced tangentially to the flash/separation vessel through at least one side inlet located in the side of said vessel, while the vapor phase is removed through an overhead outlet of the vessel.

In still another embodiment of the present invention, purging steam is introduced through the at least one side inlet of the flash/separation vessel. The purging steam is typically introduced to the flash/separation vessel at a temperature ranging from about 400 to about 550° C. steam (750 to 1025° F.), a total pressure ranging from about 0 to about 830 kPag (0 to 120 psig), and a total flow of steam equal 5 to 250 times the volume of the flash/separator vessel.

In another embodiment, purging steam is introduced to the flash/separation vessel at a temperature ranging from about 450 to about 510° C. (840 to 950° F.), a total pressure ranging from about 350 to about 700 kPag (from about 50 to about 100 psig), and a total purge steam volume equal to 100 to 200 times the volume of the flash/separator vessel.

In yet another embodiment of this aspect of the present invention, the air/steam mixture stream is introduced through the at least one side inlet of the flash/separation vessel. The air/steam mixture stream is characterized by an air/steam weight ratio ranging from about 0.01 to about 0.5, preferably from about 0.05 to about 0.2.

In another embodiment of this aspect, a major portion of the air/steam mixture is removed from the flash/separation vessel as an overhead stream and a minor portion of the air/steam mixture is removed from said flash/separation vessel as a bottoms slipstream. The minor portion is typically at least about 2% of the total air/steam mixture, typically ranging from about 5% to about 10% of the total air/steam mixture. In yet another embodiment, the amount of the air/steam mixture removed as a bottoms slipstream is controlled by at least one of a flow valve associated with the bottom outlet and one or more restriction orifices in the piping associated with the bottom outlet. The air/steam mixture is typically introduced to the flash/separation vessel under conditions sufficient to combust coke while limiting the adiabatic flame temperatures to no greater than the design temperature of the flash/separation vessel said bottoms slipstream piping. Typical design temperature ranges from about 570 to about 615° C. (1060 to 1140° F.).

The air/steam weight ratio of the air/steam mixture is typically maintained at no greater than about 0.2, during decoking of easily combusted coke, and at no greater than about 0.5 after decoking.

In one embodiment of this aspect of the present invention, the process further comprises monitoring internal temperature of the flash/separation vessel and controlling the air/steam weight ratio as a function of the internal temperature. This monitoring can be carried out by any suitable method known in the art. Typically, the monitoring is carried out by means of a thermocouple associated with the inside of the flash/separation vessel. The process can further comprise monitoring the bottoms slipstream temperature of the flash/separation vessel and controlling the air/steam weight ratio as a function of the internal temperature.

In another embodiment, the monitoring is carried out by means of a surface thermocouple attached to the outside of the bottom of the flash/separation vessel or the piping immediately downstream of the flash/separation vessel.

In yet another embodiment, monitoring is carried out by analyzing the flue gas produced during air/steam decoking for $CO/CO_2$.

The hydrocarbon feedstock with resid and coke precursors for use with the present invention typically comprises one or more of steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, atmospheric residue, heavy residue, hydrocarbon gases/residue admixtures, hydrogen/residue admixtures C4's/residue admixture, naphtha/residue admixture and gas oil/residue admixture.

In one embodiment of this aspect of the invention, the hydrocarbon feedstock with resid and coke precursors has a nominal final boiling point of at least about 315° C. (600° F.).

In still another embodiment of this aspect of the invention, the hydrocarbon feedstock with resid and coke precursors is heated by indirect contact with flue gas in a first convection section tube bank of the pyrolysis furnace before mixing with the primary dilution steam stream. The temperature of the hydrocarbon feedstock with resid and coke precursors is typically from about 150 to about 340° C. (300 to 650° F.) before mixing with the primary dilution steam stream.

In yet another embodiment of this aspect, the hydrocarbon feedstock with resid and coke precursors is mixed with a fluid in addition to the primary dilution steam stream to form the mixture stream containing coke precursors. The fluid typically comprises at least one of hydrocarbon and water, preferably water.

In still another embodiment, the mixture stream is heated by indirect contact with flue gas in a first convection section tube bank of the pyrolysis furnace before being flashed. The temperature of the flue gas entering the first convection section tube bank is typically less than about 815° C. (1500° F.), say, less than about 705° C. (1300° F.), less than about 620° C. (1150° F.), or even less than about 540° C. (1000° F.). In another embodiment, the primary dilution steam stream comprises sour or process steam.

In still yet another embodiment of this aspect of the present invention, the primary dilution steam stream is superheated in the convection section of the pyrolysis furnace.

In another embodiment, a secondary dilution steam stream is heated in a second convection section tube bank of the pyrolysis furnace and at least a portion of the secondary dilution steam stream, which can comprise sour or process steam, is then mixed with the mixture stream before flashing the mixture stream. The secondary dilution steam stream can be superheated.

In yet another embodiment, the temperature of the mixture stream before flashing in step (c) is typically from about 315 to about 560° C. (600 to 1040° F.). The mixture stream can be flashed at a pressure of from about 275 to about 1380 kPa (40 to 200 psia). Typically, about 50 to about 98 percent of the mixture stream is in the vapor phase after being flashed.

In another embodiment, the process further comprises conveying the coke precursor depleted vapor phase to a centrifugal separator to remove trace amounts of liquid before step (e).

In yet another embodiment, steam is added to the coke precursor depleted vapor phase.

In still another embodiment of this aspect of the invention, a secondary dilution steam stream is heated in a second convection section tube bank of the pyrolysis furnace and at least a portion of the secondary dilution steam stream is then mixed with the coke precursor depleted vapor phase before step (e).

In another embodiment, the vapor phase temperature entering the radiant section of the pyrolysis furnace is from about 425 to about 705° C. (800 to 1300° F.).

In another aspect, the present invention relates to an apparatus for cracking a hydrocarbon feedstock containing resid and coke precursors, comprising: (a) a heating zone for heating the hydrocarbon feedstock to provide heated hydrocarbon feedstock; (b) a mixing zone for mixing a primary dilution steam stream with the heated hydrocarbon feedstock to provide a mixture stream containing coke precursors; (c) a flash/separation vessel for flashing the mixture stream to form a coke precursor depleted vapor phase and a coke precursor rich liquid phase, the vessel comprising: (i) a bottom outlet which comprises internal surfaces and associated outlet piping, which surfaces and piping during operation become coated with the liquid phase and thereafter at least partially coked; (ii) an overhead outlet for removing the vapor phase and a trace of condensed vapor phase, which overhead outlet comprises internal surfaces and associated outlet piping, which surfaces and piping during operation become coated with condensed vapor phase and thereafter at least partially coked; (iii) an inlet for introducing sufficient purging steam to the flash/separation vessel to remove the vapor phase from the vessel and the liquid phase from the internal surfaces and/or outlet piping; and (iv) an inlet for introducing an air/steam mixture through the flash/separation vessel under conditions sufficient to at least partially combust coke on the internal surfaces and/or outlet piping;

(d) a pyrolysis furnace comprising a convection section, and a radiant section for cracking the vapor phase to produce an effluent comprising olefins; (e) a means for quenching the effluent; (f) a recovery train for recovering cracked product from the quenched effluent; (g) a means for determining the level of coking in the flash/separation vessel and/or in the associated outlet piping; and (h) a control valve for controlling the flow of the hydrocarbon feedstock with resid and coke precursors to the flash/separation vessel.

In one embodiment of this aspect of the invention, the flash/separation vessel comprises a baffle positioned above the liquid outlet. Typically, the baffle is a substantially conical baffle whose apex points upward, e.g., a perforated, substantially conical baffle. The perforations can make up at least about 1%, of its total surface area.

In another embodiment of this aspect, the flash/separation vessel is substantially cylindrical.

In yet another embodiment, the flash/separation vessel contains a means to monitor its internal temperature. Typically, any suitable means for monitoring the internal temperature can be used, e.g., one that comprises a thermocouple mounted within the flash/separation vessel.

In still another embodiment of this aspect of the invention, the flash/separation vessel further comprises at least one side inlet for tangentially introducing the mixture stream. The purging steam and/or the air/steam mixture stream can be introduced through the at least one side inlet.

In still yet another embodiment of this aspect of the invention, the apparatus further comprises a means to monitor the bottom outlet temperature. Typically, any suitable means for monitoring the internal temperature can be used, e.g., the monitoring means can comprise a surface thermocouple attached to the outside of the bottom of the flash/separation vessel or the outlet piping immediately downstream of the flash/separation vessel.

In another embodiment of this aspect of the present invention, the apparatus further comprises a means to control air/steam weight ratio of the air/steam mixture stream as a function of the internal temperature and the bottom outlet temperature.

In applying this invention, the hydrocarbon feedstock containing resid and coke precursors may be heated by indirect contact with flue gas in a first convection section tube bank of the pyrolysis furnace before mixing with a fluid, e. g., steam or water. Preferably, the temperature of the heavy hydrocarbon feedstock is from 150 to 260° C. (300 to 500° F.) before mixing with the fluid.

Following mixing with the primary dilution steam stream, the mixture stream may be heated by indirect contact with flue gas in a first convection section of the pyrolysis furnace before being flashed. Preferably, the first convection section is arranged to add the primary dilution steam stream, between passes of that section such that the hydrocarbon feedstock can be heated before mixing with the fluid and the mixture stream can be further heated before being flashed.

The temperature of the flue gas entering the first convection section tube bank is generally less than about 815° C. (1500° F.), for example less than about 705° C. (1300° F.), such as less than about 620° C. (1150° F.), and preferably less than about 540° C. (1000° F.).

Dilution steam may be added at any point in the process, for example, it may be added to the hydrocarbon feedstock before or after heating, to the mixture stream, and/or to the vapor phase. Any dilution steam stream may comprise sour or process steam. Any dilution steam stream may be heated or superheated in a convection section tube bank located anywhere within the convection section of the furnace, preferably in the first or second tube bank.

The mixture stream may be at about 315 to about 540° C. (600 to 1000° F.) before the flash in step (c), and the flash pressure may be about 275 kPa to about 1380 kPa (40 to 200 psia). Following the flash, 50 to 98% of the mixture stream may be in the vapor phase. An additional separator such as a centrifugal separator may be used to remove trace amounts of liquid from the vapor phase. The vapor phase may be heated to above the flash temperature before entering the radiant section of the furnace, for example to about 425 to about 705° C. (800 to 1300° F.). This heating may occur in a convection section tube bank, preferably the tube bank nearest the radiant section of the furnace.

BRIEF DESCRIPTION OF THE DRAWINGS

The FIGURE illustrates a schematic flow diagram of the overall process and apparatus in accordance with the present invention employed with a pyrolysis furnace.

DETAILED DESCRIPTION

Unless otherwise stated, all percentages, parts, ratios, etc. are by weight. Unless otherwise stated, a reference to a compound or component includes the compound or component by itself, as well as in combination with other compounds or components, such as mixtures of compounds.

Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

As used herein, resids are non-volatile components, e.g., the fraction of the hydrocarbon feed with a nominal boiling point above 590° C. (1100° F.) as measured by ASTM D-6352-98 or D-2887. This invention works very well with non-volatiles having a nominal boiling point above 760° C. (1400° F.). The boiling point distribution of the hydrocarbon feed is measured by Gas Chromatograph Distillation (GCD) by ASTM D-6352-98 or D-2887 extended by extrapolation for materials boiling above 700° C. (1292° F.). Non-volatiles include coke precursors, which are large, condensable molecules which condense in the vapor, and then form coke under the operating conditions encountered in the present process of the invention.

The present invention relates to a process for heating and steam cracking hydrocarbon feedstock containing resid. The process comprises heating the hydrocarbon feedstock, mixing the hydrocarbon feedstock with a fluid to form a mixture, flashing the mixture to form a vapor phase and a liquid phase, feeding the vapor phase to the radiant section of a pyrolysis furnace, and subsequently quenching the reaction, e.g., by using a transfer line exchanger, quench oil, or quench water.

The heating of the hydrocarbon feedstock can take any form known by those of ordinary skill in the art. However, as shown in the FIGURE, it is preferred that the heating comprises indirect contact of the hydrocarbon feedstock in the upper (farthest from the radiant section) convection section tube bank 2 of the furnace 1 with hot flue gases from the radiant section of the furnace. This can be accomplished, by way of non-limiting example, by passing the hydrocarbon feedstock through a bank of heat exchange tubes 2 located within the convection section 3 of the furnace 1. The heated hydrocarbon feedstock typically has a temperature between about 150 and about 260° C. (300 and 500° F.), such as about 160 to about 230° C. (325 to 450° F.), for example about 170 to about 220° C. (340 to about 425° F.).

The heated hydrocarbon feedstock is mixed with primary dilution steam and optionally, a fluid which can be a hydrocarbon, preferably liquid but optionally vapor; water, steam, or a mixture thereof. The preferred fluid is water. A source of the fluid can be low pressure boiler feed water. The temperature of the fluid can be below, equal to, or above the temperature of the heated feedstock.

The mixing of the heated hydrocarbon feedstock and the fluid can occur inside or outside the pyrolysis furnace 1, but preferably it occurs outside the furnace. The mixing can be accomplished using any mixing device known within the art. For example, it is possible to use a first sparger 4 of a double sparger assembly 9 for the mixing. The first sparger 4 can avoid or to reduce hammering, caused by sudden vaporization of the fluid, upon introduction of the fluid into the heated hydrocarbon feedstock.

The present invention uses steam streams in various parts of the process. The primary dilution steam stream 17 can be mixed with the heated hydrocarbon feedstock as detailed below. In another embodiment, a secondary dilution steam stream 18 can be heated in the convection section and mixed with the heated mixture steam before the flash. The source of the secondary dilution steam may be primary dilution steam that has been superheated, optionally in a convection section of the pyrolysis furnace. Either or both of the primary and secondary dilution steam streams may comprise sour or process steam. Superheating the sour or process dilution steam minimizes the risk of corrosion that could result from condensation of sour or process steam.

Sour steam is dilution steam made downstream of furnaces in the first distillation tower called the primary fractionator. In the primary fractionator heat is removed from the process by boiling condensed dilution steam. The condensed dilution steam can thus contain some sulfur species and acids that were in the feed or a cracked by-product. Hence the condensed dilution steam smells sour. To prevent corrosion in the process boiler where the condensed dilution steam is revaporized, chemicals are added to raise the pH. So, when the condensed dilution steam is revaporized it is less malodorous and is referred to as process steam. Process steam is made within the equipment that also handles the cracked products. Clean steam is made in the utility section of the plant from clean water, also known as boiler feed water.

In one embodiment of the present invention, in addition to the fluid mixed with the heated feedstock, the primary dilution steam 17 is also mixed with the feedstock. The primary dilution steam stream can be preferably injected into a second sparger 8. It is preferred that the primary dilution steam stream is injected into the hydrocarbon fluid mixture before the resulting stream mixture optionally enters the convection section at 11 for additional heating by flue gas, generally within the same tube bank as would have been used for heating the hydrocarbon feedstock.

The primary dilution steam can have a temperature greater, lower or about the same as hydrocarbon feedstock fluid mixture but preferably the temperature is greater than that of the mixture and serves to partially vaporize the feedstock/fluid mixture. The primary dilution steam may be superheated before being injected into the second sparger 8.

The mixture stream comprising the heated hydrocarbon feedstock, the fluid, and the optional primary dilution steam stream leaving the second sparger 8 is optionally heated again in the convection section of the pyrolysis furnace 3 before the flash. The heating can be accomplished, by way of non-limiting example, by passing the mixture stream through a bank of heat exchange tubes 6 located within the convection section, usually as part of the first convection section tube bank, of the furnace and thus heated by the hot flue gas from the radiant section of the furnace. The thus-heated mixture stream leaves the convection section as a mixture stream 12 to optionally be further mixed with an additional steam stream.

Optionally, the secondary dilution steam stream 18 can be further split into a flash steam stream 19 which is mixed with the hydrocarbon mixture 12 before the flash and a bypass steam stream 21 which bypasses the flash of the hydrocarbon mixture and, instead is mixed with the vapor phase from the flash before the vapor phase is cracked in the radiant section of the furnace. The present invention can operate with all secondary dilution steam 18 used as flash steam 19 with no bypass steam 21. Alternatively, the present invention can be operated with secondary dilution steam 18 directed to bypass steam 21 with no flash steam 19. In a preferred embodiment in accordance with the present invention, the ratio of the flash steam stream 19 to bypass steam stream 21 should be preferably 1:20 to 20:1, and most preferably 1:2 to 2:1. In this embodiment, the flash steam 19 is mixed with the hydrocarbon mixture stream 12 to form a flash stream 20 which can be introduced tangentially before the flash in flash/separator vessel 5. Preferably, the secondary dilution steam stream is superheated in a superheater section 16 in the furnace convection before splitting and mixing with the hydrocarbon mixture. The addition of the flash steam stream 19 to the hydrocarbon mixture stream 12 aids the vaporization of most volatile components of the mixture before the flash stream 20 enters the flash/separator vessel 5.

Very high volatility feedstocks (e.g., ultra light crudes and contaminated condensates) can be heated in tube bank 2 of convection section 1 forming a vapor and a liquid phase and conveyed as stream 12 directly to the separation vessel 5 without mixing with dilution steam 17 or fluid.

The mixture stream 12 or the flash stream 20 is then flashed, for example in a flash/separator vessel 5, for separation into two phases: a vapor phase comprising predominantly volatile hydrocarbons and steam and a liquid phase comprising predominantly non-volatile hydrocarbons. The vapor phase is preferably removed from the flash/separator vessel as an overhead vapor stream 13. The vapor phase, preferably, is fed via control valve 36 to a convection section tube bank 23 of the furnace, preferably located nearest the radiant section of the furnace, for optional heating and through crossover pipes 24 to the radiant section of the pyrolysis furnace for cracking. The liquid phase of the flashed mixture stream is removed from the flash/separator vessel 5 as a bottoms stream 27.

It is preferred to maintain a predetermined constant ratio of vapor to liquid in the flash/separator vessel 5, but such ratio is difficult to measure and control. As an alternative, temperature of the mixture stream 12 before the flash/separator vessel 5 can be used as an indirect parameter to measure, control, and maintain an approximately constant vapor to liquid ratio in the flash/separator vessel 5. Ideally, when the mixture stream temperature is higher, more volatile hydrocarbons will be vaporized and become available, as a vapor phase, for cracking. However, when the mixture stream temperature is too high, more heavy hydrocarbons will be present in the vapor phase and carried over to the convection furnace tubes, eventually coking the tubes. If the mixture stream 12 temperature is too low, resulting in a low ratio of vapor to liquid in the flash/separator vessel 5, more volatile hydrocarbons will remain in liquid phase and thus will not be available for cracking.

The mixture stream temperature is limited by highest recovery/vaporization of volatiles in the feedstock while avoiding excessive coking in the furnace tubes or coking in piping and vessels conveying the mixture from the flash/separator vessel to the furnace 1 via line 13. The pressure drop across the piping and vessels 13 conveying the mixture to the lower convection section 23, and the crossover piping 24, and the temperature rise across the lower convection section 23 may be monitored to detect the onset of coking problems. For instance, when the crossover pressure and process inlet pressure to the lower convection section 23 begins to increase rapidly due to coking as indicated by a rapid opening of control valve 36, the temperature in the flash/separator vessel 5 and the mixture stream 12 should be reduced or the feed rate reduced. If coking occurs in the lower convection section, the temperature of the flue gas to the superheater 16 increases, requiring more desuperheater water 26.

The selection of the mixture stream 12 temperature is also determined by the composition of the feedstock materials. When the feedstock contains higher amounts of lighter hydrocarbons, the temperature of the mixture stream 12 can be set lower. As a result, the amount of fluid used in the first sparger 4 would be increased and/or the amount of primary dilution steam used in the second sparger 8 would be decreased since these amounts directly impact the temperature of the mixture stream 12. When the feedstock contains a higher amount of non-volatile hydrocarbons, the temperature of the mixture stream 12 should be set higher. As a result, the amount of fluid used in the first sparger 4 would be decreased while the amount of primary dilution steam used in the second sparger 8 would be increased. By carefully selecting a mixture stream temperature, the present invention can find applications in a wide variety of feedstock materials.

Typically, the temperature of the mixture stream 12 can be set and controlled at between about 315 and about 540° C. (600 and 1000° F.), such as between about 370 and about 510° C. (700 and 950° F.), for example between about 400 and about 480° C. (750 and 900° F.), and often between about 430 and about 475° C. (810 and 890° F.). These values will change with the concentration of volatiles in the feedstock as discussed above.

Considerations in determining the temperature include the desire to maintain a liquid phase to reduce the likelihood of coke formation on exchanger tube walls and in the flash/separator.

The temperature of mixture stream 12 can be controlled by a control system 7 which comprises at least a temperature sensor and any known control device, such as a computer application. Preferably, the temperature sensors are thermocouples. The control system 7 communicates with the fluid valve 14 and the primary dilution steam valve 15 so that the amount of the fluid and the primary dilution steam entering the two spargers can be controlled.

In order to maintain a constant temperature for the mixture stream 12 mixing with flash steam 19 and entering the flash/separator vessel to achieve a constant ratio of vapor to liquid in the flash/separator vessel 5, and to avoid substantial temperature and flash vapor to liquid ratio variations, the present invention operates as follows: When a temperature for the mixture stream 12 before the flash/separator vessel 5 is set, the control system 7 automatically controls the fluid valve 14 and primary dilution steam valve 15 on the two spargers. When the control system 7 detects a drop of temperature of the mixture stream, it will cause the fluid valve 14 to reduce the injection of the fluid into the first sparger 4. If the temperature of the mixture stream starts to rise, the fluid valve will be opened wider to increase the injection of the fluid into the first sparger 4. In one possible embodiment, the fluid latent heat of vaporization controls mixture stream temperature.

When the primary dilution steam stream 17 is injected to the second sparger 8, the temperature control system 7 can also be used to control the primary dilution steam valve 15 to adjust the amount of primary dilution steam stream injected to the second sparger 8. This further reduces the sharp variation of temperature changes in the flash 5. When the control system 7 detects a drop of temperature of the mixture stream 12, it will instruct the primary dilution steam valve 15 to increase the injection of the primary dilution steam stream into the second sparger 8 while valve 14 is closed more. If the temperature starts to rise, the primary dilution steam valve will automatically close more to reduce the primary dilution steam stream injected into the second sparger 8 while valve 14 is opened wider.

In one embodiment in accordance with the present invention, the control system 7 can be used to control both the amount of the fluid and the amount of the primary dilution steam stream to be injected into both spargers.

In an example embodiment where the fluid is water, the controller varies the amount of water and primary dilution steam to maintain a constant mixture stream temperature 12, while maintaining a constant ratio of water+steam-to-feedstock in the mixture 11. To further avoid sharp variation of the flash temperature, the present invention also preferably utilizes an intermediate desuperheater 25 in the superheating section of the secondary dilution steam in the furnace. This allows the superheater 16 outlet temperature to be controlled at a constant value, independent of furnace load changes, coking extent changes, excess oxygen level changes, and other variables. Normally, this desuperheater 25 maintains the temperature of the secondary dilution steam between about 425 and about 590° C. (800 and 1100° F.), for example between about 455 and about 540° C. (850 and 1000° F.), such as between about 455 and about 510° C. (850 and 950° F.), and typically between about 470 and about 495° C. (875 and 925° F.). The desuperheater can be a control valve and optional water atomizer nozzle. After partial preheating, the secondary dilution steam exits the convection section and a fine mist of water 26 can be added which rapidly vaporizes and reduces the temperature. The steam is preferably then further heated in the convection section. The amount of water added to the superheater can control the temperature of the steam which is mixed with mixture stream 12.

Although the description above is based on adjusting the amounts of the fluid and the primary dilution steam streams injected into the hydrocarbon feedstock in the two spargers 4 and 8, according to the predetermined temperature of the mixture stream 12 before the flash/separator vessel 5, the same control mechanisms can be applied to other parameters at other locations. For instance, the flash pressure and the temperature and the flow rate of the flash steam 19 can be changed to effect a change in the vapor to liquid ratio in the flash. Also, excess oxygen in the flue gas can also be a control variable, albeit, possibly a slow one.

In addition to maintaining a constant temperature of the mixture stream 12 entering the flash/separator vessel, it is generally also desirable to maintain a constant hydrocarbon partial pressure of the flash stream 20 in order to maintain a constant ratio of vapor to liquid in the flash/separator vessel.

By way of examples, the constant hydrocarbon partial pressure can be maintained by maintaining constant flash/separator vessel pressure through the use of control valves 36 on the vapor phase line 13, and by controlling the ratio of steam to hydrocarbon feedstock in stream 20. The vapor phase line 13 contains a trace of condensed vapor phase in addition to the vapor phase. These trace amounts of condensed vapor phase are typically less than about 3 wt %, say, less than about 1 wt % of the total overhead stream. However, their presence is highly undesirable inasmuch as these condensates act as coke precursors.

Typically, the hydrocarbon partial pressure of the flash stream in the present invention is set and controlled at between about 25 and about 830 kPa (4 and 120 psia), such as between about 35 and about 100 kPa (5 and 15 psia), for example between about 40 and about 75 kPa (6 and 11 psia).

In one embodiment, the flash is conducted in at least one flash/separator vessel. Typically the flash is a one-stage process with or without reflux. The flash/separator vessel 5 is normally operated at about 275 to about 1400 kPg (40 to 200 psig) pressure and its temperature is usually the same or slightly lower than the temperature of the flash stream 20 before entering the flash/separator vessel 5. Typically, the temperature at which the flash/separator vessel operates is about 310 to about 540° C. (600 to about 1000° F.). For example, the pressure of the flash can be about 600 to about 1100 kPa (85 to 155 psia) and the temperature can be about 370 to about 490° C. (700 to 920° F.). As a further example, the pressure of the flash can be about 700 to about 1000 kPa (105 to 145 psia) with a temperature of about 400 to about 480° C. (750 to 900° F.). In yet another example, the pressure of the flash/separator vessel can be about 700 to about 760 kPa (105 to 125 psia) and the temperature can be about 430 to about 475° C. (810 to 890° F.). Depending on the temperature of the mixture stream 12, generally about 50 to about 98% of the mixture stream being flashed is in the vapor phase, such as about 60 to about 95%, for example about 65 to about 90%.

The flash/separator vessel 5 is generally operated, in one aspect, to minimize the temperature of the liquid phase at the bottom of the vessel because too much heat may cause coking of the non-volatiles in the liquid phase. Use of the secondary dilution steam stream 18 in the flash stream entering the flash/separator vessel lowers the vaporization temperature because it reduces the partial pressure of the hydrocarbons (i.e., a larger mole fraction of the vapor is steam) and thus lowers the required liquid phase temperature. It may also be helpful to recycle a portion of the externally cooled flash/separator vessel bottoms liquid 30 back to the flash/separator vessel to help cool the newly separated liquid phase at the bottom of the flash/separator vessel 5. Stream 27 can be conveyed from the bottom of the flash/separator vessel 5 to the cooler 28 via pump 37. The cooled stream 29 can then be split into a recycle stream 30 and export stream 22. The temperature of the recycled stream would typically be about 500 to about 600° F. (260 to 315° C.), for example 520 to 550° F. (270 to 290° C.). The amount of recycled stream can be about 80 to about 250% of the amount of the newly separated bottom liquid inside the flash/separator vessel, such as 90 to 225%, for example, 100 to 200%.

The flash is generally also operated, in another aspect, to minimize the liquid retention/holding time in the flash vessel. In one example embodiment, the liquid phase is discharged from the vessel through a small diameter "boot" or cylinder 35 on the bottom of the flash/separator vessel. Typically, the liquid phase retention time in the drum is less than 75 seconds, for example, less than 60 seconds, such as less than 30 seconds, and often less than 15 seconds. The shorter the liquid phase retention/holding time in the flash/separator vessel, the less coking occurs in the bottom of the flash/separator vessel.

Although it is the preferred embodiment for stream 27 to flow out of the bottom of the boot 35, stream 27 can be can be located as a side drawoff the boot 35 or the low section of flash/separator vessel 5.

Inasmuch as the present invention relates to controlling coking within the flash/separator vessel 5, it is noted that optimizing the cut made by the flash/separator vessel typically employs conditions of high temperatures and convection pressures. These conditions are conducive to the formation of coke by thermal cracking on the vessel internals, e.g., baffles and walls. In one embodiment of the invention, a substantially conical baffle 100, which is advantageously perforated, employed for the purpose of reducing or avoiding entrainment of liquid in the overhead, is subjected to coking of its surfaces. Moreover, coke laydown in the outlet piping (overhead outlet associated with that portion of vapor phase line 13 downstream of line 21 and bottom outlet associated with liquid phase line 27) immediately downstream of the vessel 5 is enhanced by steam stripping of the lighter components in the vessel overhead stream by bypass steam 21 injected in the overhead stream. Coke forming in the flash/separator vessel 5 and its adjacent downstream piping can be removed by techniques such as hydroblasting which requires shutdown of the furnace 1 for hydroblasting of the vessel internals and associated piping by introducing water (not shown) to the vessel. Such techniques typically require long shutdown times followed by steam purging before restarting the process.

In one embodiment of the present invention, the sensors comprise sensor 112 and sensor 114 within the vessel 5 or its boot 35. Sensors may also be positioned downstream of the vessel, e.g., downstream of where bypass stream is introduced to overhead at 116, or at 118 downstream of the boot 35 which allows monitoring the bottoms slipstream temperature of the flash/separation vessel. The sensors are typically surface thermocouples associated with the inside of the flash/separation vessel 5 or associated piping. In order to effectively remove coke, the temperature of the air/steam mixture is typically controlled to be hot enough to combust the coke, say, about 480° C. (896° F.). The air/steam ratio is typically controlled to less than about 0.2 to limit flame temperatures to about 570 to about 615° C. (1060 to 1140° F.) and the temperature of the bottoms slip stream to about 550° C. (1025° F.) so as not to exceed the allowable design temperature of the flash/separation vessel and its associated piping. Once the vessel is decoked, the air to steam rate can be increased to about 0.5. In order to effectively decoke the baffle 100 it is advantageous to provide a slipstream, say, about 10% of the air/steam mixture through the baffle perforations and around the baffle perimeter and out through the bottom outlet as stream 27 whose flow can be controlled by restriction orifices 120. The remaining 90% of the air/steam mixture can pass as overhead via 13 whose flow optionally can be controlled by 36. Both the overhead and bottom flow of the air/steam mixture can be controlled by controller 110, say, as a function of temperatures registered by one or more of the sensors. Finally, controller 110 can interrupt the flow of hydrocarbon feedstock, effect steam purge, and then resume the flow of hydrocarbon feedstock by valve 124 during the process as a function of coke levels within the vessel and associated piping, in accordance with the present invention.

Turning from the subject of controlling coking within the flash/separator vessel 5 and its associated piping, and considering the further processing of the vapor phase taken as overhead from the vessel, it is noted that the vapor phase may contain, for example, 55 to 70% hydrocarbons and 30 to 45% steam. The boiling end point of the vapor phase is normally below about 760° C. (1400° F.), such as below about 590° C. (1100° F.), and often below about 565° C. (1050° F.). The vapor phase is continuously removed from the flash/separator vessel 5 through an overhead pipe, which optionally conveys the vapor to a centrifugal separator 38 to remove trace amounts of entrained and/or condensed liquid. The vapor then typically flows into a manifold that distributes the flow to the convection section of the furnace.

The vapor phase stream 13 continuously removed from the flash/separator vessel is preferably superheated in the pyrolysis furnace lower convection section 23 to a temperature of, for example, about 425 to about 705° C. (800 to 1300° F.) by the flue gas from the radiant section of the furnace. The vapor phase is then introduced to the radiant section of the pyrolysis furnace to be cracked.

The vapor phase stream 13 removed from the flash/separator vessel can optionally be mixed with a bypass steam stream 21 before being introduced into the furnace lower convection section 23.

The bypass steam stream 21 is a split steam stream from the secondary dilution steam 18. Preferably, the secondary dilution steam is first heated in the convection section of the pyrolysis furnace 3 before splitting and mixing with the vapor phase stream removed from the flash 5. The superheating after the mixing of the bypass steam 21 with the vapor phase stream 13 ensures that all but the heaviest components of the mixture in this section of the furnace are vaporized before entering the radiant section. Raising the temperature of vapor phase to about 425 to about 705° C. (800 to 1300° F.) in the lower convection section 23 also helps the operation in the radiant section since radiant tube metal temperature can be reduced. This results in less coking potential in the radiant section. The superheated vapor is then cracked in the radiant section of the pyrolysis furnace.

The overhead vapor from the flash/separation vessel is optionally heated to a sufficient temperature for passing to the radiant (cracking) zone of the pyrolysis furnace. In the radiant zone the feed is thermally cracked to produce an effluent comprising olefins, including ethylene and other desired light olefins, and byproducts which is passed to a recovery train for recovery of products as known in the art.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process for removing coke formed during cracking of a hydrocarbon feedstock containing resid and coke precursors, said process comprising:
   (a) heating said hydrocarbon feedstock;
   (b) mixing the heated hydrocarbon feedstock with a primary dilution steam stream to form a mixture stream containing coke precursors;
   (c) flashing the mixture stream in a flash/separation vessel to form a coke precursor depleted vapor phase and a coke precursor rich liquid phase;
   (d) removing the liquid phase through a bottom outlet and vapor phase with a trace of condensed vapor phase through an overhead outlet in the flash/separation vessel which vessel comprises internal surfaces and associated outlet piping, which surfaces and piping become coated during operation with said liquid phase and/or said condensed vapor phase and thereafter at least partially coked;
   (e) cracking the vapor phase in a radiant section of a pyrolysis furnace to produce an effluent comprising olefins, said pyrolysis furnace comprising a radiant section and a convection section;
   (f) quenching the effluent and recovering cracked product therefrom; and
   (g) determining the level of coking in said flash/separation vessel or in piping immediately downstream of said flash/separation vessel, and when a predetermined upper coke level is reached;
      (i) interrupting flow of said hydrocarbon feedstock containing resid and coke precursors to said flash/separation vessel;
      (ii) purging said flash/separation vessel with steam under conditions sufficient to substantially remove said vapor phase from said vessel and said liquid phase from said internal surfaces and/or outlet piping;
      (iii) introducing an air/steam mixture through said flash/separation vessel under conditions sufficient to at least partially combust coke on said internal surfaces and outlet piping; and
      (iv) restarting the flow of said hydrocarbon feedstock to said flash/separation vessel when a predetermined lower coke level on said internal surfaces and/or outlet piping is reached.

2. The process of claim 1 wherein said flash/separation vessel comprises a baffle positioned above the liquid outlet which carries liquid outward and from the center of the vessel and downward.

3. The process of claim 2 wherein said baffle is a substantially conical baffle whose apex points up.

4. The process of claim 2 wherein said baffle is a perforated, substantially conical baffle.

5. The process of claim 4 wherein said baffle comprises perforations substituting for at least about 1% of its total surface area.

6. The process of claim 1 wherein said flash/separation vessel is substantially cylindrical.

7. The process of claim 6 wherein said mixture stream is introduced tangentially through at least one side inlet located in the side of said vessel, radially through at least one side inlet located in the side of said vessel, through the top of said vessel and/or through the bottom of said vessel, and said vapor phase is removed through an overhead outlet of said vessel.

8. The process of claim 7 wherein said mixture stream is introduced tangentially to the flash/separation vessel though at least one side inlet located in the side of said vessel.

9. The process of claim 7 wherein said purging steam is introduced through said at least one side inlet.

10. The process of claim 7 wherein said air/steam mixture steam is introduced through said at least one side inlet.

11. The process of claim 1 wherein said purging steam is introduced to said flash/separation vessel at a temperature ranging from about 400 to about 550° C. steam (750 to 1025° F.), a total pressure ranging from about 0 to about 830 kPag (0 to 120 psig), and a total flow of steam equal 5 to 250 times the volume of the flash/separator vessel.

12. The process of claim 11 wherein said purging steam is introduced to said flash/separation vessel at a temperature ranging from about 450 to about 510° C. (840 to 950° F.), a total pressure ranging from about 350 to about 700 kPag (from about 50 to about 120 psig), and a total flow of steam equal 100 to 200 times the volume of the flash/separator vessel.

13. The process of claim 1 wherein a major portion of said air/steam mixture is removed from said flash/separation vessel as an overhead stream and a minor portion of said air/steam mixture is removed from said flask/separation vessel as a bottoms slipstream.

14. The process of claim 13 wherein said minor portion is at least about 2% of the total air/steam mixture.

15. The process of claim 13 wherein said minor portion ranges from about 5% to about 10% of the total air/steam mixture.

16. The process of claim 13 wherein the amount of said air/steam mixture removed as a bottoms slipstream is controlled by a flow valve associated with the bottom outlet.

17. The process of claim 13 wherein the amount of said air/steam mixture removed as a bottoms slipstream is controlled by one or more restriction orifices in the piping associated with the bottom outlet.

18. The process of claim 13 wherein said air/steam mixture is introduced to said flash/separation vessel under conditions sufficient to combust coke while limiting adiabatic flame temperatures to no greater than the design temperature of the piping for said bottoms slipstream piping of the flash/separation vessel.

19. The process of claim 18 wherein said design temperature ranges from about 570 to about 615° C. (1060 to 1140° F.).

20. The process of claim 1 wherein an air/steam weight ratio of the air/steam mixture is maintained at no greater than about 0.2 during decoking.

21. The process of claim 20 wherein said air/steam weight ratio of the air/steam mixture is maintained at no greater than about 0.5 after coke in the flash/separator is removed.

22. The process of claim 18 which further comprises monitoring internal temperature of the flash/separation vessel and controlling said air/steam weight ratio as a function of said internal temperature.

23. The process of claim 22 wherein said monitoring is carried out by means of a thermocouple associated with the inside of said flash/separation vessel.

24. The process of claim 18 which further comprises monitoring the bottoms slipstream temperature of the flash/separation vessel and controlling said air/steam weight ratio as a function of said internal temperature.

25. The process of claim 24 wherein said monitoring is carried out by means of a surface thermocouple attached to the outside of the bottom of the flask/separation vessel or the piping immediately downstream of said flash/separation vessel.

26. The process of claim 25 wherein said monitoring is carried out by analyzing the flue gas produced during air/steam decoking for $CO/CO_2$.

27. The process of claim 1, wherein the hydrocarbon feedstock with resid and coke precursors comprises one or more of steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, atmospheric residue, heavy residue, hydrocarbon gases/residue admixtures, hydrogen/residue admixtures C4's/residue admixture, naphtha/residue admixture and gas oil/residue admixture.

28. The process of claim 1, wherein the hydrocarbon feedstock with resid and coke precursors has a nominal final boiling point of at least about 315° C. (600° F.).

29. The process of claim 1, wherein the hydrocarbon feedstock with resid and coke precursors is heated by indirect contact with flue gas in a first convection section tube bank of the pyrolysis furnace before mixing with the primary dilution steam stream.

30. The process of claim 1, wherein the temperature of the hydrocarbon feedstock with resid and coke precursors is from about 150 to about 340° C. (300 to 650° F.) before mixing with the primary dilution steam stream.

31. The process of claim 1, wherein the hydrocarbon feedstock with resid and coke precursors is mixed with a fluid in addition to said primary dilution steam stream to form said mixture stream containing coke precursors.

32. The process of claim 31, wherein the fluid comprises at least one of hydrocarbon and water.

33. The process of claim 32, wherein the fluid is water.

34. The process of claim 1, wherein the mixture stream is heated by indirect contact with flue gas in a first convection section tube bank of the pyrolysis furnace before being flashed.

35. The process of claim 34, wherein the temperature of the flue gas entering the first convection section tube bank is less than about 815° C. (1500° F.).

36. The process of claim 35, wherein the temperature of the flue gas entering the first convection section tube bank is less than about 705° C. (1300° F.).

37. The process of claim 36, wherein the temperature of the flue gas entering the first convection section tube bank is less than about 620° C. (1150° F.).

38. The process of claim 37, wherein the temperature of the flue gas entering the first convection section tube bank is less than about 540° C. (1000° F.).

39. The process of claim 1, wherein the primary dilution steam stream comprises sour or process steam.

40. The process of claim 1, wherein the primary dilution steam stream is superheated in the convection section of the pyrolysis furnace.

41. The process of claim 40, wherein a secondary dilution steam stream is heated in a second convection section tube bank of the pyrolysis furnace and at least a portion of said secondary dilution steam stream is then mixed with the mixture stream before flashing the mixture stream.

42. The process of claim 41, wherein the secondary dilution steam stream comprises sour or process steam.

43. The process of claim 41, wherein the secondary dilution steam stream is superheated.

44. The process of claim 41, wherein a second fluid is added to the mixture stream before flashing the mixture stream, said second fluid being a hydrocarbon vapor.

45. The process of claim 1, wherein the temperature of the mixture stream before flashing in step (c) is from about 315 to about 560° C. (600 to 1040° F.).

46. The process of claim 1, wherein the mixture stream is flashed at a pressure of from about 275 to about 1380 kPag (40 to 200 psig).

47. The process claim 1, wherein about 50 to about 98 percent of the mixture stream is in the vapor phase after being flashed.

48. The process of claim 1, further comprising conveying the coke precursor depleted vapor phase to a centrifugal separator to remove trace amounts of liquid before step (e).

49. The process of claim 1, wherein steam is added to the coke precursor depleted vapor phase.

50. The process of claim 1, wherein a secondary dilution steam stream is heated in a second convection section tube bank of the pyrolysis furnace and at least a portion of said secondary dilution steam stream is then mixed with the coke precursor depleted vapor phase before step (e).

51. The process of claim 1, wherein the vapor phase temperature entering the radiant section of the pyrolysis furnace is from about 425 to about 705° C. (800 to 1300° F.).

52. The process of claim 1 wherein said quenching is carried out by a transfer line exchanger.

* * * * *